Figures 3, 4:
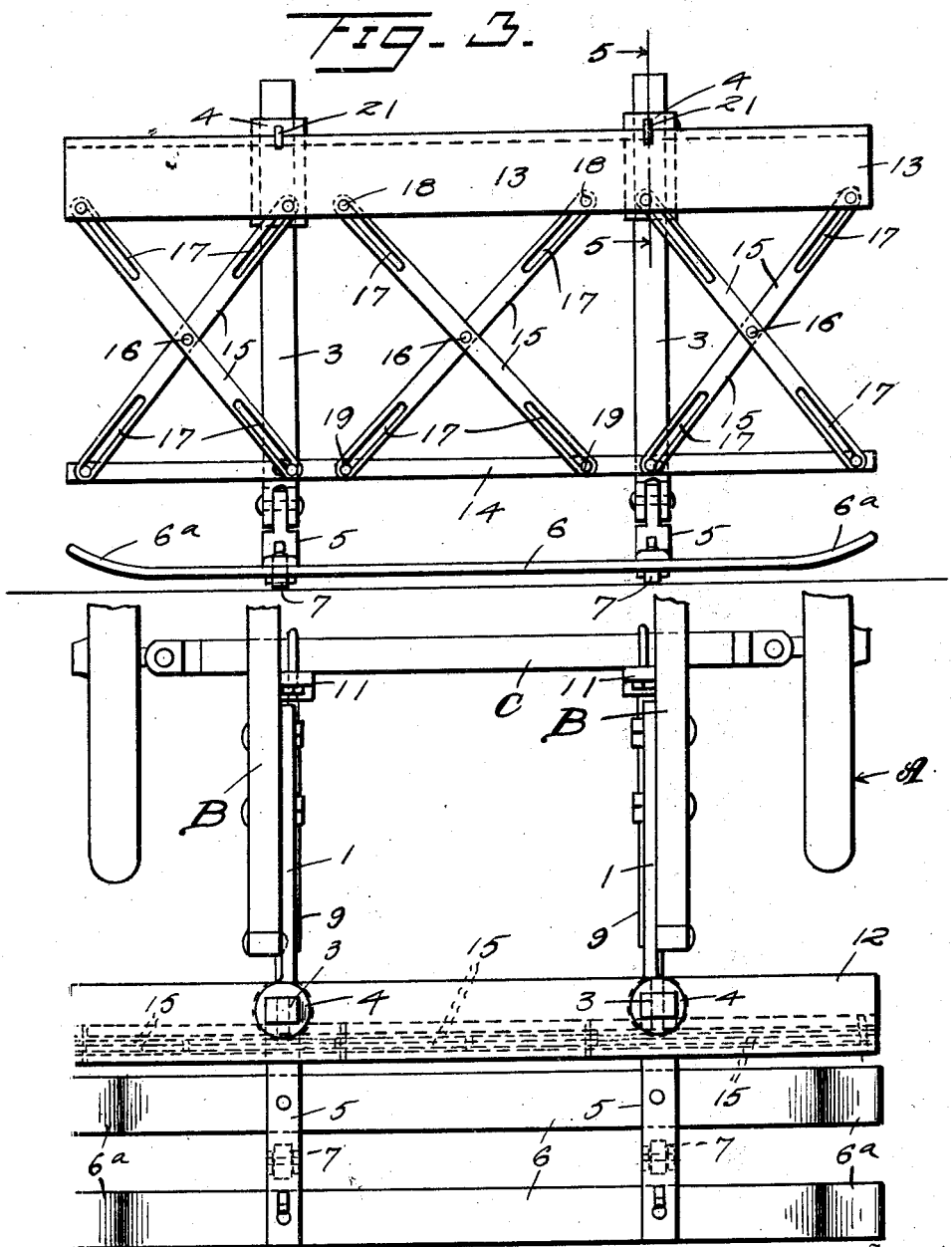

Nov. 17, 1925.
H. E. HUDGINS
BUMPER
Filed March 17, 1925 2 Sheets-Sheet 1
1,562,329
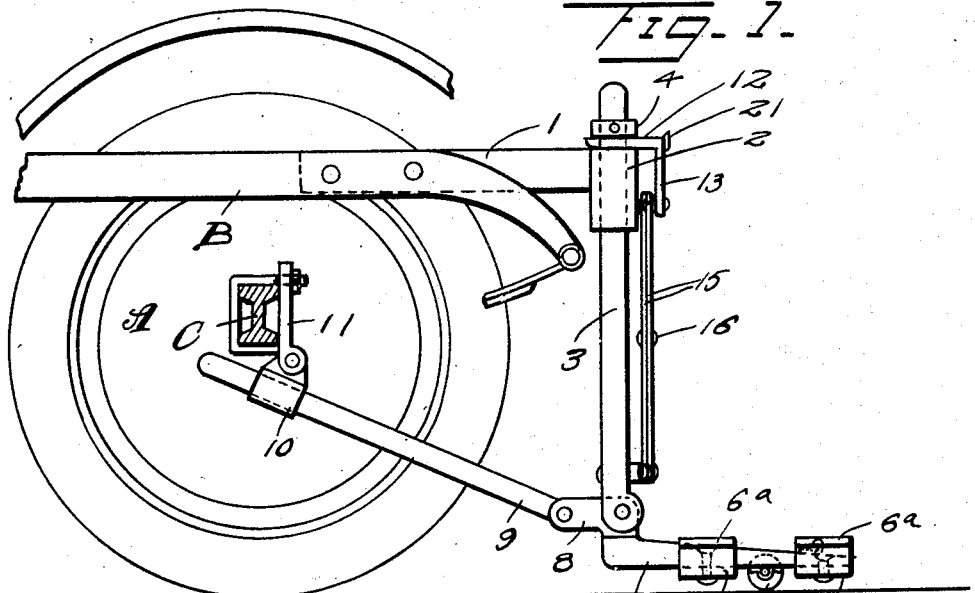
Fig. 1.
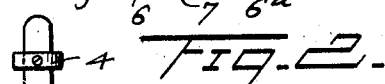
Fig. 2.
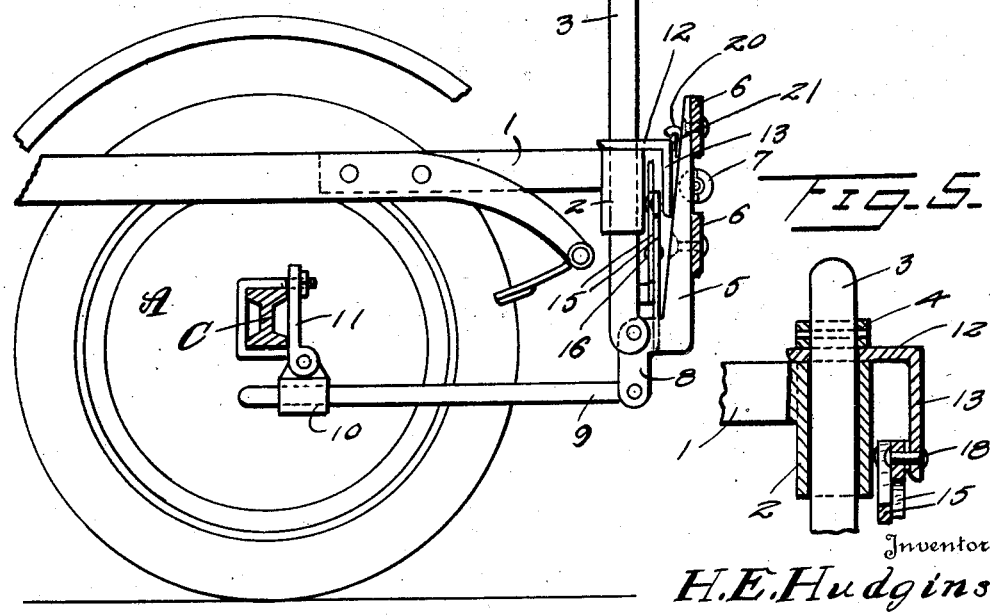
Fig. 3.
Inventor
H. E. Hudgins
By
Attorney Nov. 17, 1925.

H. E. HUDGINS

BUMPER

Filed March 17, 1925     2 Sheets-Sheet 2

1,562,329

Inventor
H. E. Hudgins.

Patented Nov. 17, 1925.

1,562,329

UNITED STATES PATENT OFFICE.

HERBERT E. HUDGINS, OF SHREVEPORT, LOUISIANA.

BUMPER.

Application filed March 17, 1925. Serial No. 16,168.

*To all whom it may concern:*

Be it known that I, HERBERT E. HUDGINS, a citizen of the United States, residing at Shreveport, in the parish of Caddo and State of Louisiana, have invented certain new and useful Improvements in Bumpers; and I do hereby declare the following to be a full, clear, and exact description of the invention, such as will enable others skilled in the art to which it appertains to make and use the same.

The invention relates to bumpers for motor vehicles and the like, designed to prevent injury to pedestrians in crowded thoroughfares, and has for its object the provision of an improved construction of bumpers to be mounted on the front of motor vehicles and arranged to fold and be held in a folded position when not in use, and can be quickly released and extended when it is necessary to use it.

The details of the construction and operation of the invention will be described hereinafter and will be found illustrated in the accompanying drawings, in which—

Figure 1 is a side view of the bumper mounted on the front of a motor vehicle, showing the bumper in an extended position, Figure 2 is a similar view showing the bumper folded, Figure 3 is a front view of the bumper in an extended position, Figure 4 a top plan view, and Figure 5 is a detail sectional view on a plane indicated by the line 5—5 of Figure 3, looking in the direction of the arrows.

In the drawings similar reference characters will be used to designate corresponding parts throughout the several views.

The bumper is disclosed as secured to the front end of a motor vehicle that is designated A having side beams B and the front axle C. Secured to the side beams B are bars 1 having their front terminals provided with tubular guides 2 and slidably mounted in tubular guides 2 are rods 3 limited in their lower position by means of collars 4 secured thereto in the usual manner.

On the lower ends of rods 3 are pivotally mounted angular arms 5 having cross pieces 6 secured to the under side of the forward extensions of said arms and roller casters 7 journaled thereon between said cross pieces 6 to support the forward extensions of arms 5 when in lowered and operative positions.

The ends of cross pieces 6 are preferably curved upwardly as shown at 6ª. Arms 5 are also formed with rearward extensions 8, and a rod 9 is pivotally secured to each rearward extension 8 and slidably mounted in a sleeve 10 pivotally engaging a clamp member 11 secured to axle C.

Secured to each tubular guide 2 is an angle beam 12, supported by one of its flanges, while the other flange indicated at 13 is extended downwardly and spaced apart from the tubular guide 2. Secured to rods 3, adjacent their lower ends, is a cross bar 14. 15 designates cross bars pivotally engaging one another at 16, and provided with elongated slots 17 adjacent each of their ends that slidably engage pins 18 on flange 13 and pins 19 on cross bar 14. It will be apparent that this construction admits of collapsing the bumper into the position shown in Figure 2, and that when the bumper is extended as shown in Figures 1 and 3, the cross bars 15 serve to prevent any objects that may be picked up by the platform formed by the cross pieces 6 being thrown back of the bumper.

When the bumper is in folded position as shown in Figure 2 it is held in an elevated position by means of hooks 20 engaging lugs 21 on angular beam 12.

In operation it will be apparent that when the bumper is in a lowered position as shown in Figure 1 that the rollers 7 will engage the surface of the roadway and the device will pick up and prevent injury to any pedestrian or other object that may be in the way of the motor vehicle, the rod 9 operating to hold the arms 5 in their lowered position, but by slidably engaging the sleeves 10 do not interfere with folding of the arms toward the rods 3 when the rods 3 are raised in the position shown in Figure 2 when the bumper is not in use.

What is claimed is:—

1. In a bumper, slidable rods, arms pivotally mounted on said rods, and a platform pivotally mounted on said arms.

2. In combination with a motor vehicle having side beams, a bar secured to each side beam, a tubular guide on each bar, a rod slidably mounted in each tubular guide, an arm pivotally secured to each rod, and a platform pivotally mounted on said arms.

3. In combination with a motor vehicle having side beams and an axle, a bar secured to each side beam, a tubular guide on each bar, a rod slidably mounted in each guide, an arm pivotally mounted on each rod and having an extension, a rod pivotally engaging said extension, a guide for said rod pivotally mounted on the axle, and a platform carried by said arms.

4. In combination with a motor vehicle having side beams, tubular guides mounted on said beams, rods slidably mounted on said guides, a platform pivotally mounted on the rods, a cross beam mounted on said rods, another cross beam secured thereto, and foldable crossed rods slidably engaging said cross beams.

In testimony whereof I affix my signature.

HERBERT E. HUDGINS.